United States Patent
Wu

(10) Patent No.: US 9,019,951 B2
(45) Date of Patent: Apr. 28, 2015

(54) ROUTING APPARATUS AND METHOD FOR PROCESSING NETWORK PACKET THEREOF

(75) Inventor: Pei-Lin Wu, Hsinchu (TW)

(73) Assignee: Gemtek Technology Co., Ltd., Hsinchu (TW)

( * ) Notice: Subject to any disclaimer, the term of this patent is extended or adjusted under 35 U.S.C. 154(b) by 854 days.

(21) Appl. No.: 13/192,488

(22) Filed: Jul. 28, 2011

(65) Prior Publication Data

US 2012/0054365 A1 Mar. 1, 2012

(30) Foreign Application Priority Data

Aug. 24, 2010 (TW) ................................ 99128284 A

(51) Int. Cl.
*H04L 12/725* (2013.01)
*H04L 29/06* (2006.01)
*H04L 12/927* (2013.01)

(52) U.S. Cl.
CPC ............. *H04L 45/302* (2013.01); *H04L 47/805* (2013.01); *H04L 63/0227* (2013.01); *H04L 63/101* (2013.01)

(58) Field of Classification Search
None
See application file for complete search history.

(56) References Cited

U.S. PATENT DOCUMENTS

| | | | | |
|---|---|---|---|---|
| 7,218,632 B1* | 5/2007 | Bechtolsheim et al. | ...... | 370/389 |
| 7,644,085 B2* | 1/2010 | Miller et al. | ................... | 707/797 |
| 7,808,929 B2* | 10/2010 | Wong et al. | ................... | 370/255 |
| 2008/0123622 A1* | 5/2008 | Kaganoi et al. | ............... | 370/351 |

FOREIGN PATENT DOCUMENTS

| | | |
|---|---|---|
| CN | 1477494 | 2/2004 |
| CN | 1863142 | 11/2006 |
| CN | 101146027 | 3/2008 |

OTHER PUBLICATIONS

"Office Action of China Counterpart Application", issued on Jul. 18, 2014, p. 1-p. 5.
"Office Action of Taiwan Counterpart Application", issued on Mar. 25, 2014, p. 1-p. 8.

* cited by examiner

*Primary Examiner* — Hong Cho
(74) *Attorney, Agent, or Firm* — Jianq Chyun IP Office

(57) ABSTRACT

A routing apparatus and a method thereof for processing a network packet are provided. In the present method, a plurality of packet processing rules comprising a plurality of conditions are defined in the routing apparatus, and a relationship between each condition and the relative packet processing rules is recorded. After a packet enters the routing apparatus, it is determines that whether a specific packet processing rule can be found among the packet processing rules according to a plurality of packet information and the predefined relationship. If the specific packet processing rule can be found, the packet is processed by the specific packet processing rule. As a result, the performance of the routing apparatus and the processing speed can be increased.

10 Claims, 5 Drawing Sheets

| Referential number of rules | R1 | R2 | R3 | R4 | R5 |
|---|---|---|---|---|---|
| Source interface | LAN | WAN | * | * | LAN |
| Destination interface | * | * | WAN | * | * |
| Source address | 192.168.1.100 | 192.168.100.1 | * | 192.168.2.1 | 192.168.1.100 |
| Destination address | 140.114.1.1 | * | 140.114.5.1 | 140.114.1.1 | 140.114.1.155 |
| Network service | * | * | HTTP | ICMP | HTTP |
FIG. 3
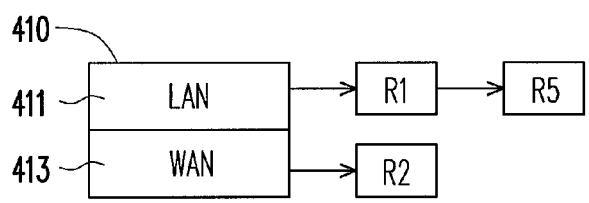
FIG. 4A
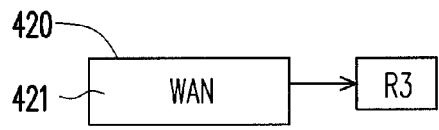
FIG. 4B

| Referential number of rules | R1 | R2 | R3 | R4 | R5 |
|---|---|---|---|---|---|
| Source interface | LAN | WAN | * | * | LAN |
| Destination interface | * | * | WAN | * | * |
| Source address | 192.168.1.100 | 192.168.100.1 | * | 192.168.2.1 | 192.168.1.100 |
| Destination address | 140.114.1.1 | * | 140.114.5.1 | 140.114.1.1 | 140.114.1.155 |
| Network service | * | * | HTTP | ICMP | HTTP |

ROUTING APPARATUS AND METHOD FOR PROCESSING NETWORK PACKET THEREOF

CROSS-REFERENCE TO RELATED APPLICATION

This application claims the priority benefit of Taiwan application serial no. 99128284, filed Aug. 24, 2010. The entirety of the above-mentioned patent application is hereby incorporated by reference herein and made a part of this specification.

BACKGROUND

1. Field of the Invention

The invention relates to a method for processing packet. Particularly, the invention relates to a method for processing a packet and a routing apparatus thereof capable of improving a network processing performance.

2. Description of Related Art

With booming development of network technology, modern people may not only obtain required information through the network at any time, but can also conduct leisure, social and business activities through the network. However, due to the convenience of the network, a lot of important data are spread in the network. To avoid the data being maliciously captured, many safety control mechanisms are accordingly developed.

Taking a network apparatus using a Linux operating system as a software structure as an example, data safety is maintained through rule comparison of an access control list (ACL) rule and a quality of services (QoS) rule at a forward hook. In detail, to achieve a firewall effect, each time when a packet enters the network apparatus, the forward hook compares the packet with each of the ACL rule and the QoS rule. Namely, the forward hook sequentially obtains the ACL rule and the QoS rule, and has to obtain a packet information each time for comparing each of the rules. In some cases, only after all of the rules are compared, the network apparatus can determine whether such packet matches the ACL rule and the QoS rule. Therefore, when a number of the ACL rules and the QoS rules required to be compared is increased, longer time is required for accomplishing the check, which may have a negative influence on network processing performance.

SUMMARY OF THE INVENTION

Accordingly, the invention is directed to a method for processing a network packet, which may improve a rule comparison efficiency for incoming packets.

The invention is directed to a routing apparatus, which may avoid comparing a packet with all of rules, so as to improve a network processing speed.

The invention provides a method for processing a network packet, adapted to a routing apparatus recording a plurality of packet processing rules, the packet processing rules comprise a plurality of check conditions. In the method, the packet processing rules corresponding to each of the check conditions are defined and recorded. After a path selection process is performed to a packet entering the routing apparatus, a plurality of packet information of the packet is obtained. For each of the packet information, a check condition complying with the packet information is searched from all of the check conditions, and the packet processing rules corresponding to the searched check condition is marked. It is determined whether a specific packet processing rule exists according to all of the marked packet processing rules. If the specific packet processing rule exists, the packet is processed according to the specific packet processing rule.

In an embodiment of the invention, the check conditions are divided into a plurality of condition types, and the step of defining and recording the packet processing rules corresponding to each of the check conditions can be described as follows. One of the condition types is obtained to serve as a processing condition type. A data structure corresponding to the processing condition type is established. The packet processing rules in which the comprised check conditions are belonged to the processing condition type and have a same content are found from all of the packet processing rules. The found packet processing rules correspond to a same entry field in the data structure.

In an embodiment of the invention, the step of for each of the packet information, searching the check condition complying with the packet information from all of the check conditions, and marking the packet processing rules corresponding to the searched check condition can be described as follows. A specific entry field is found from the data structure corresponding to a type of the packet information according to a content of the packet information. The packet processing rules corresponding to the specific entry field are respectively defined as candidate packet processing rules. In the check conditions comprised in each of the candidate packet processing rules, a check condition complying with the packet information is marked as a confirm condition.

In an embodiment of the invention, the check conditions are divided into a plurality of condition types, and the step of defining and recording the packet processing rules corresponding to each of the check conditions can be described as follows. One of the condition types is obtained to serve as a processing condition type. A data structure corresponding to the processing condition type is established. The packet processing rules in which the comprised check conditions are belonged to the processing condition type and have a same content hash value are found from all of the packet processing rules. The found packet processing rules correspond to a same entry field in the data structure.

In an embodiment of the invention, the step of for each of the packet information, searching the check condition complying with the packet information from all of the check conditions, and marking the packet processing rules corresponding to the searched check condition can be described as follows. A specific entry field is found from the data structure corresponding to a type of the packet information according to a hash value of the packet information. In all packet processing rules corresponding to the specific entry field, the packet processing rules having contents the same to that of the packet information are respectively defined as candidate packet processing rules. In the check conditions comprised in each of the candidate packet processing rules, a check condition complying with the packet information is marked as a confirm condition.

In an embodiment of the invention, the step of determining whether the specific packet processing rule exists according to all of the marked packet processing rules comprises determining whether a packet processing rule in which the corresponding check conditions are all marked exists, and if yes, the packet processing rule in which the corresponding check conditions are all marked is defined as the specific packet processing rule.

In an embodiment of the invention, types of the check conditions and the packet information comprise at least one of a source interface, a destination interface, a source address, a destination address and a network service.

In an embodiment of the invention, types of the packet processing rules comprise at least one of an access control list (ACL) rule and a quality of services (QoS) rule.

According to another aspect, the invention provides a routing apparatus including a storage unit, a rule corresponding module, a path selection module, a rule filtering module and a rule execution module. Wherein, the storage unit records a plurality of packet processing rules, and the packet processing rules comprise a plurality of check conditions. The rule corresponding module is coupled to the storage unit, and is used for defining and recording the packet processing rules corresponding to each of the check conditions in the storage unit. The path selection module is used for executing a path selection process to a packet entering the routing apparatus. The rule filtering module is coupled to the path selection module and the storage unit. After the rule filtering module obtains a plurality of packet information of the packet, for each of the packet information, the rule filtering module searches a check condition complying with the packet information from the check conditions, marks the packet processing rules corresponding to the searched check condition, and determines whether a specific packet processing rule exists according to all of the marked packet processing rules. The rule execution module is coupled to the rule filtering module and the storage unit, and when the rule filtering module determines that the specific packet processing rule exists, the rule execution module processes the packet according to the specific packet processing rule.

In an embodiment of the invention, the check conditions are divided into a plurality of condition types, and the rule corresponding module obtains one of the condition types to serve as a processing condition type, establishes a data structure corresponding to the processing condition type, and finds the packet processing rules in which the comprised check conditions are belonged to the processing condition type and have a same content from all of the packet processing rules, and corresponds the found packet processing rules to a same entry field in the data structure.

In an embodiment of the invention, the rule filtering module finds a specific entry field from the data structure corresponding to a type of the packet information according to a content of the packet information, respectively defines all packet processing rules corresponding to the specific entry field as candidate packet processing rules, and marks a check condition in the check conditions comprised in each of the candidate packet processing rules that is complying with the packet information as a confirm condition.

In an embodiment of the invention, the check conditions are divided into a plurality of condition types, and the rule corresponding module obtains one of the condition types to serve as a processing condition type, establishes a data structure corresponding to the processing condition type, and finds the packet processing rules in which the comprised check conditions are belonged to the processing condition type and have a same content hash value from all of the packet processing rules, and corresponds the found packet processing rules to a same entry field in the data structure.

In an embodiment of the invention, the rule filtering module finds a specific entry field from the data structure corresponding to a type of the packet information according to a hash value of the packet information, and in all of the packet processing rules corresponding to the specific entry field, the rule filtering module respectively defines all of the packet processing rules in which the comprised check conditions having contents the same to that of the packet information as candidate packet processing rules, and in the check conditions comprised in each of the candidate packet processing rules, the rule filtering module marks a check condition complying with the packet information as a confirm condition.

In an embodiment of the invention, the rule filtering module determines whether a packet processing rule in which the corresponding check conditions are all marked exists in all of the packet processing rules, and if yes, the rule filtering module defines the packet processing rule in which the corresponding check conditions are all marked as the specific packet processing rule.

In an embodiment of the invention, types of the check conditions and the packet information comprise at least one of a source interface, a destination interface, a source address, a destination address and a network service.

In an embodiment of the invention, types of the packet processing rules comprise at least one of an access control list rule and a quality of services rule.

According to the above descriptions, under a premise that the routing apparatus can support a firewall and/or quality of services, an efficiency of comparing the packet with the packet processing rules can be improved, so as to improve a system performance of the routing apparatus.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3 is a schematic table of packet processing rules according to an embodiment of the invention.

FIGS. 4A-4E are schematic diagrams illustrating data structures corresponding to condition types according to the embodiment of FIG. 3.

DETAILED DESCRIPTION OF DISCLOSED EMBODIMENTS

Figure 1:
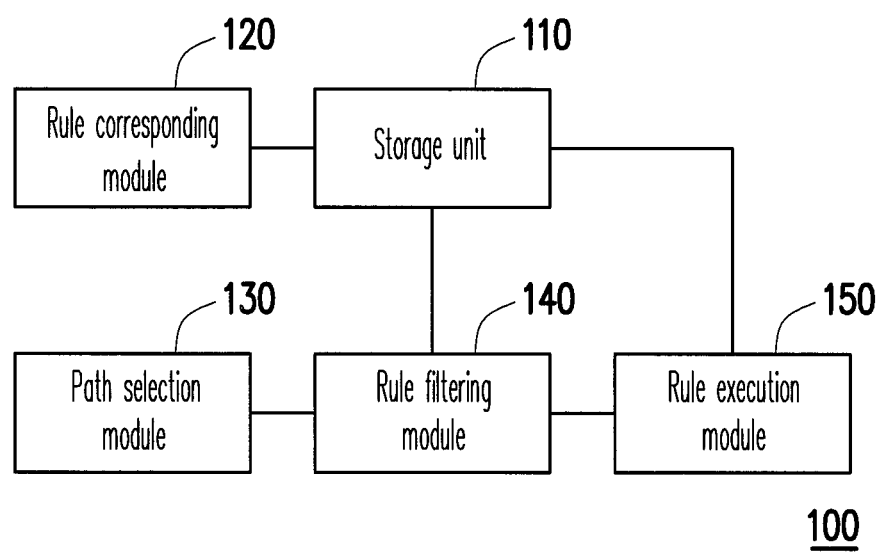
FIG. 1 is a block diagram illustrating a routing apparatus according to an embodiment of the invention.

FIG. 1 is a block diagram illustrating a routing apparatus according to an embodiment of the invention. Referring to FIG. 1, the routing apparatus 100 includes a storage unit 110, a rule corresponding module 120, a path selection module 130, a rule filtering module 140 and a rule execution module 150. Wherein, a software structure of the routing apparatus 100 is, for example, implemented by a Linux operating system, though the invention is not limited thereto.

The storage unit 110 is, for example, a memory, which is used for recording a plurality of packet processing rules set by a user. In the present embodiment, types of the packet processing rules may be an access control list (ACL) rule and/or a quality of services (QoS) rule. Wherein, each packet processing rule has at least one check condition, and different packet processing rules may include the same check condition.

When the type of the packet processing rules is the ACL rule, condition types of the check conditions included in the packet processing rules may be a source interface, a destination interface, a source address, a destination address and a network service. When the type of the packet processing rules is the QoS rule, condition types of the check conditions included in the packet processing rules may be the source interface, the source address, the destination address and the network service. Wherein, the source interface and the destination interface are, for example, local area networks (LANs) or wide area networks (WANs), etc., the source address and the destination address can be Internet protocol (IP) addresses or media access control (MAC) addresses, and the network service includes a hypertext transfer protocol (HTTP), an Internet control message protocol (ICMP) or other network protocols belonged to a layer 4 network.

When the user sets each of the packet processing rules, the user can set a content of the packet processing rule according to at least one of the above condition types. For example, if the user wants to limit a first specific host in a LAN from accessing the network, and assuming an IP address of the first specific host is 192.168.1.100, the user may set a packet processing rule (a type thereof is the ACL rule) including two check conditions, and the two check conditions are respectively "the source interface is LAN" and "the source address is 192.168.1.100", and an effect of the packet processing rule is accessing denial. Moreover, if the user wants to limit a second specific host (and assuming an IP address thereof is 192.168.2.1) in the LAN from accessing the network, the user can additionally set a packet processing rule including two check conditions, and the two check conditions are respectively "the source interface is LAN" and "the source address is 192.168.2.1", and an effect of the packet processing rule is also accessing denial. In the present embodiment, both of the above two packet processing rules include a same check condition (i.e. "the source interface is LAN").

The rule corresponding module 120 is coupled to the storage unit 110. The rule corresponding module 120 defines a relationship between each of the check conditions and the packet processing rules, and records the relationship in the storage unit 110.

The path selection module 130 is used for executing a path selection process to a packet entering the routing apparatus 100, so as to determine a destination of the packet required to be transferred.

The rule filtering module 140 is coupled to the path selection module 130 and the storage unit 110. After the path selection module 130 performs the path selection process to the packet, the rule filtering module 140 obtains a plurality of packet information of the packet. Wherein, types of the packet information include the source interface, the destination interface, the source address, the destination address and the network service. Then, the rule filtering module 140 determines whether one or more than one specific packet processing rules exist among all of the packet processing rules according to the packet information. If the specific packet processing rule exists, the rule execution module 150 coupled to the rule filtering module 140 and the storage unit 110 processes the packet according to the specific packet processing rule.

In the present embodiment, the rule corresponding module 120 establishes data structures for storing the packet processing rules corresponding to each of the check conditions, and after the packet enters the routing apparatus 100, the specific packet processing rule is searched by comparing the packet information. If the specific packet processing rule cab be found, the packet is processed only according to the specific packet processing rule. In other words, comparison of other packet processing rules that are not belonged to the specific packet processing rules is unnecessary. In this way, a whole performance of the routing apparatus 100 can be greatly increased by reducing a number of times of rule comparison.

Figure 2:
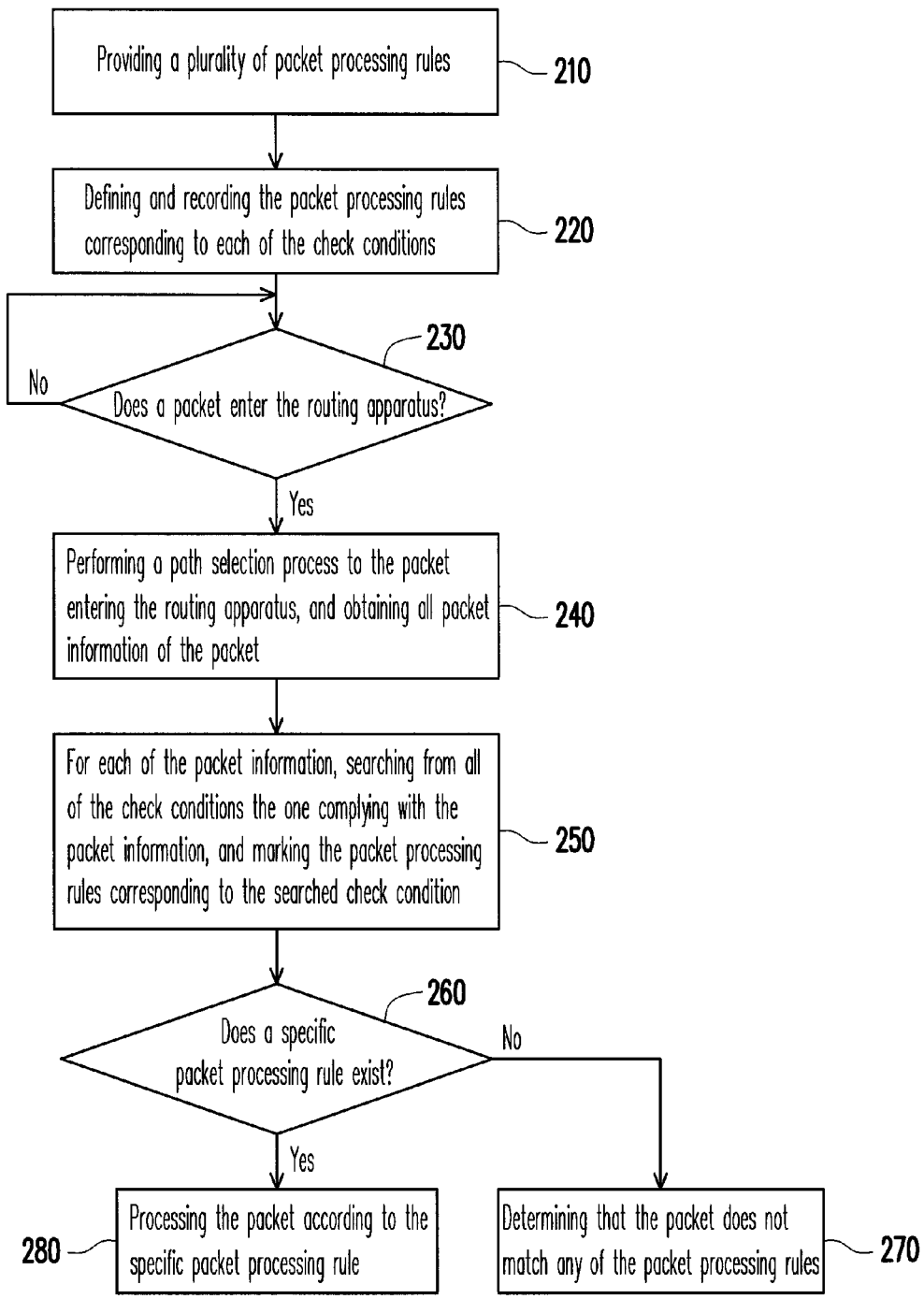
FIG. 2 is a flowchart illustrating a method for processing a network packet according to an embodiment of the invention.

FIG. 2 is a flowchart illustrating a method for processing a network packet according to an embodiment of the invention. Referring to FIG. 1 and FIG. 2, first, in step 210, a plurality of packet processing rules is provided, wherein the packet processing rules are recorded in the storage unit 110, and the packet processing rules are, for example, preset by the user. The packet processing rules include a plurality of check conditions.

Next, in step 220, the rule corresponding module 120 defines a relationship between each of the check conditions and the packet processing rules, and records the relationship in the storage unit 110. In the present embodiment, since the check conditions can be divided into a plurality of condition types, the rule corresponding module 120 can establish a data structure for each of the condition types for recording the packet processing rules corresponding to each of the check conditions belonged to such condition type. Wherein, the data structure may be a table or a linked list, though the invention is not limited thereto.

For simplicity's sake, assuming the storage unit 110 records 5 packet processing rules as that shown in FIG. 3, and the 5 packet processing rules are respectively numbered as R1 to R5. In the present embodiment, the packet processing rule R1 includes three check conditions, which are respectively "the source interface is LAN", "the source address is 192.168.1.100" and "the destination address is 140.114.1.1". The packet processing rule R2 includes two check conditions, which are respectively "the source interface is WAN", "the source address is 192.168.100.1". In the table of FIG. 3, the block marked by "*" represents that the corresponding packet processing rule does not limit a content of the check condition belonged to such condition type.

A table 410 in FIG. 4A is a data structure established corresponding to a condition type of the source interface according to the embodiment of FIG. 3. Detailed steps for establishing the table 410 are described as follows. First, the rule corresponding module 120 obtains the condition type of the source interface from all of the condition types to serve as a processing condition type. Then, the rule corresponding module 120 establishes a data structure corresponding to the processing condition type. In the present embodiment, the data structure is a table, though in other embodiments, the data structure can also be other types of data structure such as a linked list, etc. Then, the rule corresponding module 120 finds the packet processing rules in which the included check conditions are belonged to the processing condition type (i.e. the source interface) and have a same content from all of the packet processing rules recorded by the storage unit 110, and corresponds the found packet processing rules to a same entry field in the data structure. In the present embodiment, both of the packet processing rules R1 and R5 include the check condition of "the source interface is LAN", so that the two packet processing rules R1 and R5 correspond to an entry field 411 of the table 410. Moreover, since only the packet processing rule R2 includes the check condition of "the source interface is WAN", only the packet processing rule R2 corresponds to an entry field 413 of the table 410.

A table 420 in FIG. 4B is a data structure established corresponding to a condition type of the destination interface according to the embodiment of FIG. 3. Since the method of establishing the table 420 is the same or similar to the method of establishing the table 410, a detailed description thereof is not repeated.

In the embodiments of FIG. 4A and FIG. 4B, each entry field of the data structure represents a check condition that the condition type and the content thereof are all the same. Therefore, a size of the data structure relates to a number of such condition type supported by the routing apparatus 100. For example, the more the source interfaces supported by the routing apparatus 100 are, the larger space is required for storing the data structure of the corresponding source interfaces.

However, regarding the condition type of the source address, since a data length of each source address is 32 bits, to exhaust all possible source addresses, the data structure requires $2^{32}$ entry fields. Therefore, to save a storage space, the rule corresponding module 120 may construct the data structure according to a hash value of a content of each check condition.

Figure 4C:
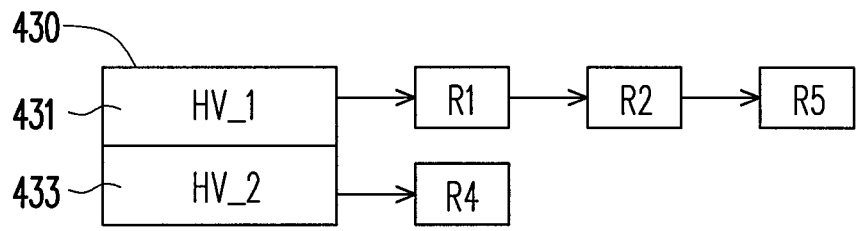
Figure 4D:
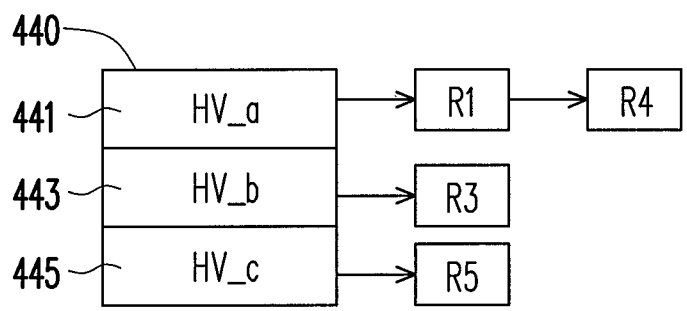
Figure 4E:
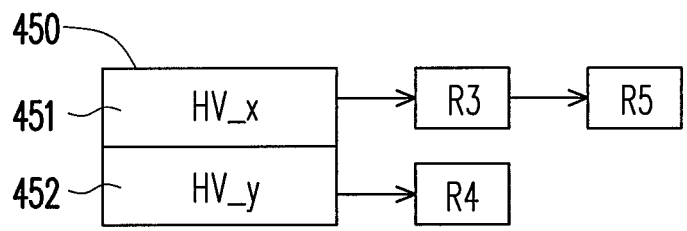

A table 430 in FIG. 4C is a data structure established corresponding to a condition type of the source address according to the embodiment of FIG. 3. In the present embodiment, after the rule corresponding module 120 selects the condition type of the source address to serve as the processing condition type, the rule corresponding module 120 establishes a data structure (i.e. the table 430) corresponding to the source addresses. Then, for each of the packet processing rules, a hash function is used to calculate hash values of contents of the included check conditions belonged to the source address, and all packet processing rules having the same hash value are corresponded to the same entry field of the table 430. In the present embodiment, assuming the hash values of contents of the source addresses of the packet processing rules R1, R2 and R5 are all HV_1, the rule corresponding module 120 corresponds the packet processing rules R1, R2 and R5 to an entry field 431 of the table 430. Assuming in all of the packet processing rules, the hash value of the content of the source address of only the packet processing rule R4 is HV_2, only the packet processing rule R4 is corresponded to an entry field 433 of the table 430. In other words, in the present embodiment, each entry field in the data structure corresponds to one hash value, and the packet processing rules having the same content hash value are corresponded to the same entry field.

Since data structures corresponding to two condition types of the destination address and the network service can be established according to similar method as that described above, detailed descriptions thereof are not repeated. Each time when the rule corresponding module 120 corresponds one packet processing rule to a certain entry field, it also records contents of the check conditions included in such packet processing rule for later comparison. It should be noticed that the hash function is not limited by the invention.

After the data structure corresponding to each of the condition types is established, in step 230, it is repeatedly determined whether a packet enters the routing apparatus 100. If the packet enters the routing apparatus 100, in step 240, the path selection module 130 executes a path selection process to the packet entering the routing apparatus 100. Then, the rule filtering module 140 may obtain all packet information of the packet, wherein types of the packet information include the source interface, the destination interface, the source address, the destination address and the network service.

Then, in step 250, the rule filtering module 140 searches a check condition complying with the packet information from all of the check conditions for each of the packet information, and marks the packet processing rules corresponding to the searched check condition. Then, in step 260, the rule filtering module 140 determines whether a specific packet processing rule exists according to all of the marked packet processing rules.

In detail, the rule filtering module 140 obtains the corresponding data structure recorded in the storage unit 110 according to a type of the packet information, and accordingly marks a part of the packet processing rules to determine whether the specific packet processing rule exists.

In an embodiment, the rule filtering module 140 first obtains a corresponding data structure from the storage unit 110 according to the type of the packet information. Then, the rule filtering module 140 finds a specific entry field from the obtained data structure according to a content of the packet information, and respectively defines all packet processing rules corresponding to the specific entry field as candidate packet processing rules. Finally, in the check conditions included in each of the candidate packet processing rules, the rule filtering module 140 marks a check condition complying with the packet information as a confirm condition.

In another embodiment, after the rule filtering module 140 obtains the corresponding data structure from the storage unit 110 according to the type of the packet information, the rule filtering module 140 finds a specific entry field from the obtained data structure according to a hash value of the packet information. Then, in all of the packet processing rules corresponding to the specific entry field, the rule filtering module 140 finds the packet processing rules in which the included check conditions having contents the same to that of the packet information, and respectively defines the found packet processing rules as candidate packet processing rules. Finally, in the check conditions included in each of the candidate packet processing rules, the rule filtering module 140 marks a check condition complying with the packet information as a confirm condition.

After the above marking operation is performed to all of the packet information, the rule filtering module 140 determines whether a packet processing rule in which the corresponding check conditions are all marked exists in all of the packet processing rules. If yes, the rule filtering module 140 defines the above packet processing rule as the specific packet processing rule.

For example, it is assumed that the packet information of the packet entering the routing apparatus 100 are respectively "the source interface is LAN", "the destination interface is WAN", "the source address is 192.168.1.100", "the destination address is 140.114.1.155" and "the network service is HTTP".

According to the embodiments of FIG. 3, FIGS. 4A-4E, it is assumed that the rule filtering module 140 first processes the packet information of "the source interface is LAN". The rule filtering module 140 obtains the table 410 of FIG. 4A from the storage unit 110, takes the entry field 411 as the specific entry field, and defines the packet processing rules R1 and R5 corresponding to the entry field 411 as the candidate packet processing rules. Then, the rule filtering module 140 marks the check conditions included in the packet processing rules R1 and R5 that are complying with "the source interface is LAN" as the confirm conditions. A marking result is as that shown in FIG. 5 (in FIG. 5, the check conditions marked as the confirm conditions are shadowed).

When the packet information processed by the rule filtering module 140 is "the destination interface is WAN", the rule filtering module 140 obtains the table 420 of FIG. 4B from the storage unit 110, takes the entry field 421 as the specific entry field, and defines the packet processing rule R3 corresponding to the entry field 421 as the candidate packet processing rule. Similarly, as that shown in FIG. 5, in the check conditions included in the packet processing rule R3, the check condition having a content complying with "the source interface is WAN" is marked as the confirm condition (the check condition marked as the confirm condition is shadowed).

Moreover, when the packet information processed by the rule filtering module 140 is "the source address is 192.168.1.100", the rule filtering module 140 obtains the table 430 of FIG. 4C from the storage unit 110. Assuming a hash value of the packet information calculated according to the hash function is "HV_1", the rule filtering module 140 selects the entry field 431 as the specific entry field, and defines the packet processing rules R1, R2 and R5 corresponding to the entry field 431 as the candidate packet processing rules. However, since the same hash value is not necessarily result in a same content of the packet information, the rule filtering module 140 compares the content of the packet information to the contents of the check conditions included in each of the candidate packet processing rules, and in the check conditions included in each of the packet processing rules R1, R2 and R5, only the check conditions having contents the same to "the source address is 192.168.1.100" are marked as the confirm conditions. As that shown in FIG. 5, in the check conditions included in the candidate packet processing rules R1, R2 and R5, only the check conditions included in the packet processing rules R1 and R5 that are complying with "the source address is 192.168.1.100" are marked as the confirm conditions (the check conditions marked as the confirm condition are shadowed).

Figures 5, 6:
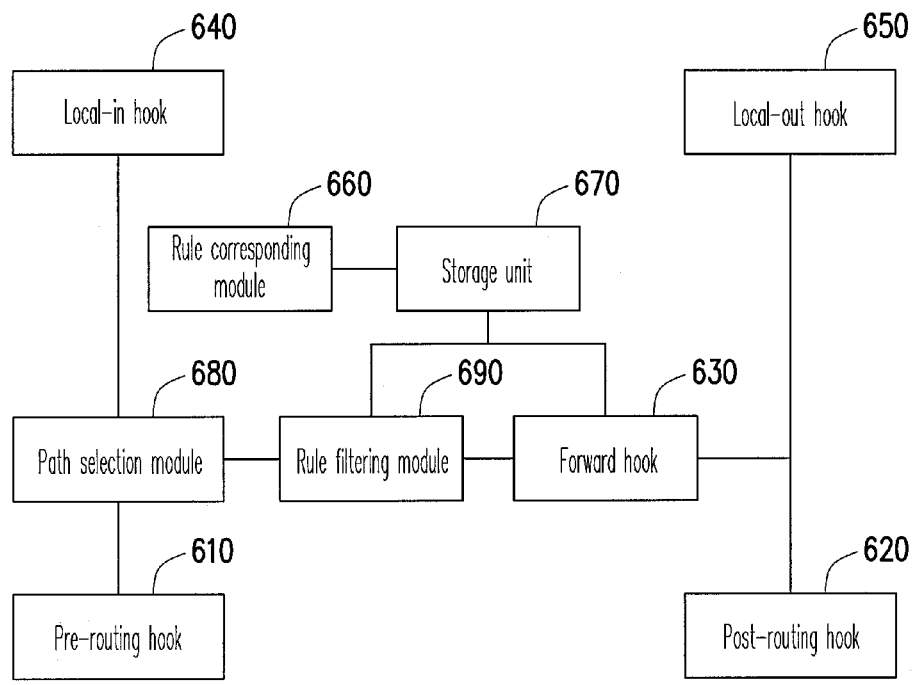
FIG. 5 is a schematic diagram illustrating a marking result of packet processing rules according to an embodiment of the invention.
FIG. 6 is a block diagram illustrating a routing apparatus according to another embodiment of the invention.

The rule filtering module 140 also performs the above operations to the packet information of "the destination address is 140.114.1.155" and "the network service is HTTP", so as to mark a part of the check conditions as the confirm conditions, and a whole marking result is as that shown in FIG. 5. According to FIG. 5, it is obvious that the four check conditions included in the packet processing rule R5 are all marked as the confirm conditions, so that the rule filtering module 140 defines the packet processing rule R5 as the specific packet processing rule.

Referring back to FIG. 2, if none of the packet processing rules is defined as the specific packet processing rule by the rule filtering module 140, in step 270, the rule filtering module 140 determines that the packet does not match any of the packet processing rules. Now, the rule execution module 150 processes the packet according to a predetermined operation.

However, if the specific packet processing rule exists, in step 280, the rule execution module 150 processes the packet according to the specific packet processing rule.

FIG. 6 is a block diagram illustrating a routing apparatus according to another embodiment of the invention. In the present embodiment, a software structure of the routing apparatus 600 is implemented by the Linux operating system. The routing apparatus 600 includes a pre-routing hook 610, a post-routing hook 620, a forward hook 630, a local-in hook 640, a local-out hook 650, a rule corresponding module 660, a storage unit 670, a path selection module 680 and a rule filtering module 690. Since functions of the rule corresponding module 660, the storage unit 670, the path selection module 680 and the rule filtering module 690 are the same or similar to that of the rule corresponding module 120, the storage unit 110, the path selection module 130 and the rule filtering module 140 of FIG. 1, detailed descriptions thereof are not repeated.

In the present embodiment, a function of the forward hook 630 is the same to that of the rule execution module 150. Therefore, in the routing apparatus 600, the rule filtering module 690 is required to be located in front of the forward hook 630. In this way, after a packet enters the routing apparatus 600, and is processed by the path selection module 680, the rule filtering module 690 first determines whether a specific packet processing rule exists, and if yes, the forward hook 630 processes the packet according to the specific packet processing rule.

In summary, in the routing apparatus and the method for processing the network packet of the invention, data structures are established to record the packet processing rules corresponding to each of the check conditions, and after the packet enters the routing apparatus, the packet information and the data structures are quickly compared to determine whether a specific packet processing rule exists. If the specific packet processing rule is found, the packet can be directly processed according to the specific packet processing rule. In this way, a number of times for rule comparison can be reduced to greatly increase a system performance and increase a network processing speed.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A method for processing a network packet, adapted to a routing apparatus recording a plurality of packet processing rules, the packet processing rules comprising a plurality of check conditions, and the method for processing the network packet comprising:

defining and recording the packet processing rules corresponding to each of the check conditions, wherein the check conditions are divided into a plurality of condition types, and the step of defining and recording the packet processing rules corresponding to each of the check conditions comprises:
obtaining one of the condition types to serve as a processing condition type;
establishing a data structure corresponding to the processing condition type;
finding the packet processing rules in which the comprised check conditions are belonged to the processing condition type and have a same content from all of the packet processing rules; and
corresponding the found packet processing rules to a same entry field in the data structure;

performing a path selection process to a packet entering the routing apparatus to obtain a plurality of packet information of the packet;

for each of the packet information, searching a check condition complying with the packet information from all of the check conditions, and marking the packet processing rules corresponding to the searched check condition, wherein the step of for each of the packet information, searching the check condition complying with the packet information from all of the check conditions, and marking the packet processing rules corresponding to the searched check condition comprises:
finding a specific entry field from the data structure corresponding to a type of the packet information according to a content of the packet information;
respectively defining the packet processing rules corresponding to the specific entry field as candidate packet processing rules; and marking a check condition in the check conditions comprised in each of the candidate packet processing rules that is complying with the packet information as a confirm condition;

determining whether a specific packet processing rule exists according to all of the marked packet processing rules; and processing the packet according to the specific packet processing rule if the specific packet processing rule exists.

2. The method for processing the network packet as claimed in claim 1, wherein the step of determining whether the specific packet processing rule exists according to all of the marked packet processing rules comprises;

determining whether a packet processing rule in which the corresponding check conditions are all marked exists in the packet processing rules; and if yes, defining the packet processing rule in which the corresponding check conditions are all marked as the specific packet processing rule.

3. The method for processing the network packet as claimed in claim 1, wherein types of the check conditions and the packet information comprise at least one of a source interface, a destination interface, a source address, a destination address and a network service.

4. The method for processing the network packet as claimed in claim 1, wherein types of the packet processing rules comprise at least one of an access control list (ACL) rule and a quality of services (QoS) rule.

5. A routing apparatus, comprising:

a storage unit, for recording a plurality of packet processing rules, and the packet processing rules comprising a plurality of check conditions;

a rule corresponding module, coupled to the storage unit, for defining and recording the packet processing rules corresponding to each of the check conditions in the storage unit, wherein the check conditions are divided into a plurality of condition types, and the rule corresponding module obtains one of the condition types to serve as a processing condition type, establishes a data structure corresponding to the processing condition type, and finds the packet processing rules in which the comprised check conditions are belonged to the processing condition type and have a same content from all of the packet processing rules, and corresponds the found packet processing rules to a same entry field in the data structure;

a path selection module, for executing a path selection process to a packet entering the routing apparatus;

a rule filtering module, coupled to the path selection module and the storage unit, wherein after the rule filtering module obtains a plurality of packet information of the packet, for each of the packet information, the rule filtering module obtains a corresponding data structure, searches a check condition complying with the packet information from all of the check conditions in parallel according to the corresponding data structure, marks the packet processing rules corresponding to the searched check condition, and determines whether a specific packet processing rule exists according to all of the marked packet processing rules, wherein the rule filtering module finds a specific entry field from the data structure corresponding to a type of the packet information according to a content of the packet information, respectively defines all packet processing rules corresponding to the specific entry field as candidate packet processing rules, and marks a check condition in the check conditions comprised in each of the candidate packet processing rules that is complying with the packet information as a confirm condition; and a rule execution module, coupled to the rule filtering module and the storage unit, wherein when the rule filtering module determines that the specific packet processing rule exists, the rule execution module processes the packet according to the specific packet processing rule.

6. The routing apparatus as claimed in claim 5, wherein the rule filtering module determines whether a packet processing rule in which the corresponding check conditions are all marked exists in the packet processing rules, and if yes, the rule filtering module defines the packet processing rule in which the corresponding check conditions are all marked as the specific packet processing rule.

7. The routing apparatus as claimed in claim 5, wherein types of the check conditions and the packet information comprise at least one of a source interface, a destination interface, a source address, a destination address and a network service.

8. The routing apparatus as claimed in claim 5, wherein types of the packet processing rules comprise at least one of an access control list rule and a quality of services rule.

9. A method for processing a network packet, adapted to a routing apparatus recording a plurality of packet processing rules, the packet processing rules comprising a plurality of check conditions, and the method for processing the network packet comprising:

defining and recording the packet processing rules corresponding to each of the check conditions, wherein the check conditions are divided into a plurality of condition types, and the step of defining and recording the packet processing rules corresponding to each of the check conditions comprises:

obtaining one of the condition types to serve as a processing condition type;

establishing a data structure corresponding to the processing condition type;

finding the packet processing rules in which the comprised check conditions are belonged to the processing condition type and have a same content hash value from all of the packet processing rules; and corresponding the found packet processing rules to a same entry field in the data structure;

performing a path selection process to a packet entering the routing apparatus to obtain a plurality of packet information of the packet;

for each of the packet information, searching a check condition complying with the packet information from all of the check conditions, and marking the packet processing rules corresponding to the searched check condition, wherein the step of for each of the packet information, searching the check condition complying with the packet information from all of the check conditions, and marking the packet processing rules corresponding to the searched check condition comprises:

finding a specific entry field from the data structure corresponding to a type of the packet information according to a hash value of the packet information;

in all of the packet processing rules corresponding to the specific entry field, respectively defining the packet processing rules in which the comprised check conditions having contents the same to that of the packet information as candidate packet processing rules; and marking a check condition in the check conditions comprised in each of the candidate packet processing rules that is complying with the packet information as a confirm condition;

determining whether a specific packet processing rule exists according to all of the marked packet processing rules; and processing the packet according to the specific packet processing rule if the specific packet processing rule exists.

10. A routing apparatus, comprising:

a storage unit, for recording a plurality of packet processing rules, and the packet processing rules comprising a plurality of check conditions;

a rule corresponding module, coupled to the storage unit, for defining and recording the packet processing rules corresponding to each of the check conditions in the storage unit, wherein the check conditions are divided into a plurality of condition types, and the rule corresponding module obtains one of the condition types to serve as a processing condition type, establishes a data structure corresponding to the processing condition type, and finds the packet processing rules in which the comprised check conditions are belonged to the processing condition type and have a same content hash value from all of the packet processing rules, and corresponds the found packet processing rules to a same entry field in the data structure;

a path selection module, for executing a path selection process to a packet entering the routing apparatus;

a rule filtering module, coupled to the path selection module and the storage unit, wherein after the rule filtering module obtains a plurality of packet information of the packet, for each of the packet information, the rule filtering module obtains a corresponding data structure, searches a check condition complying with the packet information from all of the check conditions in parallel according to the corresponding data structure, marks the packet processing rules corresponding to the searched check condition, and determines whether a specific packet processing rule exists according to all of the marked packet processing rules, wherein the rule filtering module finds a specific entry field from the data structure corresponding to a type of the packet information according to a hash value of the packet information, and in all of the packet processing rules corresponding to the specific entry field, the rule filtering module respectively defines the packet processing rules in which the comprised check conditions having contents the same to that of the packet information as candidate packet processing rules, and in the check conditions comprised in each of the candidate packet processing rules, the rule filtering module marks a check condition complying with the packet information as a confirm condition; and a rule execution module, coupled to the rule filtering module and the storage unit, wherein when the rule filtering module determines that the specific packet processing rule exists, the rule execution module processes the packet according to the specific packet processing rule.

* * * * *